United States Patent [19]

Huret, deceased et al.

[11] Patent Number: 4,493,489
[45] Date of Patent: Jan. 15, 1985

[54] DEVICE FOR FIXING A DERAILLEUR ON A FRAME LUG

[75] Inventors: Roger Huret, deceased, late of Nanterre, France; by Alain P. B. Huret, legal representative, Bougival; by Gerard Huret, legal representative, Fourqueux, both of France

[73] Assignee: Huret et ses Fils, Nanterre, France

[21] Appl. No.: 359,124

[22] Filed: Mar. 17, 1982

[30] Foreign Application Priority Data

Mar. 23, 1981 [FR] France .................. 81 05719

[51] Int. Cl.³ .................. B62M 9/06; F16H 11/00
[52] U.S. Cl. .................. 280/238; 280/288
[58] Field of Search .......... 280/236, 238, 288, 289 R; 301/105 B, 111, 124 R; 474/82, 80; 403/348, 350, 351, 352

[56] References Cited

U.S. PATENT DOCUMENTS 2,397,382 3/1946 Smith .................. 403/350
4,035,097 7/1977 Baehand .................. 403/348
4,259,873 4/1981 Nagano et al. .................. 474/82

FOREIGN PATENT DOCUMENTS 1062372 4/1954 France .................. 280/238
297649 3/1954 Switzerland .................. 280/238

OTHER PUBLICATIONS

Service Manual (Campagnolo) printed in Handbook of Cycl-ology by Cycle Good Corp., Minnetonka, Minn. at p. 141, 1976.

Primary Examiner—Joseph F. Peters, Jr.
Assistant Examiner—Donn McGiehan
Attorney, Agent, or Firm—Trexler, Bushnell & Wolters

[57] ABSTRACT

The fixing device is cheap and facilitates the mounting of the derailleur on the frame lug. This is achieved in providing on the support of the derailleur a wedging device which is rotatably mounted on the support with a high degree of friction and is adapted to cooperate with the frame lug. The support further comprises preferably an elastically yieldable device which is capable of clipping in the slot of the frame lug so as to center the support.

10 Claims, 4 Drawing Figures

DEVICE FOR FIXING A DERAILLEUR ON A FRAME LUG

DESCRIPTION

BACKGROUND OF THE INVENTION

1. Field of the Invention

The present invention relates to derailleurs for cycles and more particularly to the mounting thereof on the frame.

2. Description of the Prior Art

It is known that a derailleur is usually carried by a support plate which is secured to the rear frame lug of the bicycle. The assembly comprising the derailleur and its support plate is mounted in two stages. First of all, this assembly is placed in position on the frame lug and secured to the latter by a screw and nut device. Thereafter, when mounting the wheel hub, the support plate is secured to the frame lug at the same time as the hub.

The fact of first of all securing the support plate to the frame lug by means of a screw and nut device has many drawbacks.

Firstly, there must be employed a special nut which has two shoulders which ensure the guiding in the slot or slideway of the frame lug and two wings or ears which bear against the rear face of this frame lug. This nut is consequently relatively expensive since its production implies a turning operation.

Another drawback resides in the fact that, upon the assembly of the derailleur and its support plate, this screw and the nut, which will subsequently secure the plate to the frame lug, must be mounted on the plate. This consequently implies a first slight tightening of the nut and the screw followed by an untightening in order to permit the mounting of the plate on the frame lug, and a further tightening for fixing the plate in position. Note that this second tightening operation is delicate since it requires the use of two spanners and the support plate must be at the same time correctly positioned with respect to the frame lug. There is also a risk, in the course of the various derailleur handling operations, of the screw and nut becoming untightened and coming away from the support plate.

SUMMARY OF THE INVENTION

An object of the present invention is to provide a device for mounting the derailleur and its support plate on the frame lug which avoids these various drawbacks and is simpler, cheaper and easier to mount.

This is achieved in providing on the support plate wedging means which are rotatably mounted with a high degree of friction on said plate and are adapted to cooperate with the frame lug, the support plate further comprising preferably elastically yieldable means capable of being clipped in the slot or slideway of the frame lug for centering the support plate.

According to one embodiment of the invention, the wedging means comprise a stud which laterally projects from the support plate, said stud comprising a cylindrical active surface whose base has an elliptical, oval or like shape and whose radial dimension varies between two values which are respectively less than and greater than the width of the slot in the frame lug.

According to a second embodiment of the invention, the wedging means comprise an inclined surface which cooperates with the side of the frame lug opposed to the side against which the support plate bears.

The invention will be described in more detail hereinafter with reference to the accompanying drawing which is given solely by way of example a full stop:

DESCRIPTION OF THE PREFERRED EMBODIMENT

Figure 1:
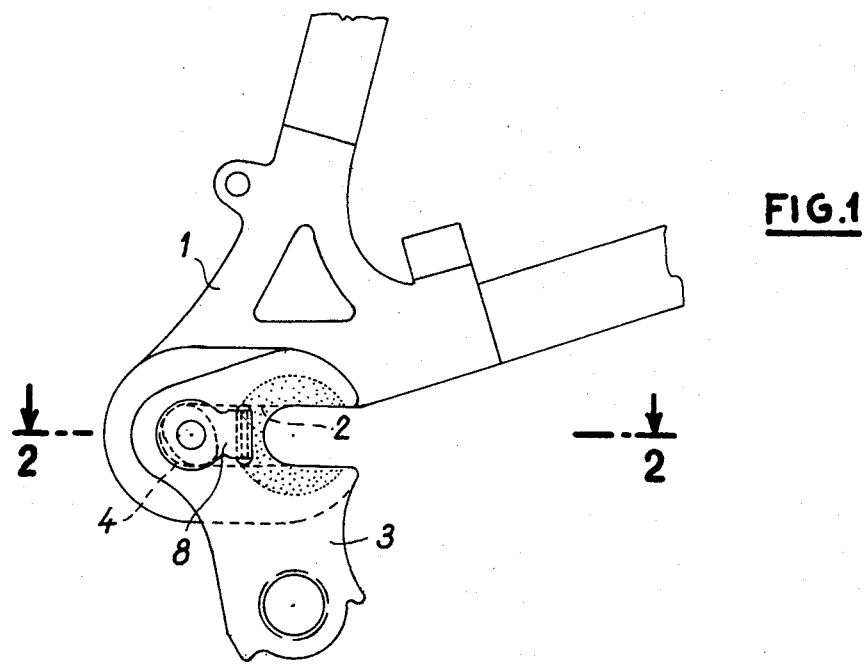
FIG. 1 is a side elevational view of a first embodiment of a device for mounting a derailleur according to the invention.
Figure 2:
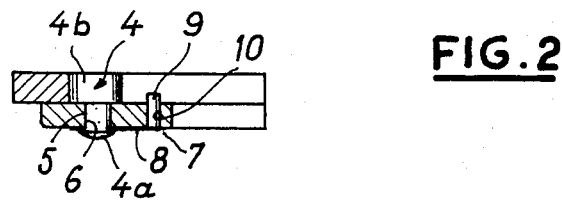
FIG. 2 is a sectional view taken on line 2—2 of FIG. 1.

FIG. 1 shows a frame lug 1 defining a slot or slideway 2 on which a derailleur support plate 3 must be mounted.

The support plate comprises a mounting stud 4 which is, for example, retained in an aperture 6 in the support plate by a riveting at 4a and is rotatably mounted in this aperture by a stem 5 with a high degree of friction. This stud 4 has a cylindrical lateral wall 4b whose cross-sectional shape is non-circular. It has preferably an elliptical, oval or like shape and a radial dimension between two values which are respectively less than and greater than the width of the slot in the frame lug.

The support plate is also provided with centering means 7 comprising an elastically yieldable strip 8 which is held in position at the same time as the stud 4 and includes a formed-over end portion 9 which projects through an aperture 10 in the support plate.

A derailleur carried by such a support plate is placed in position and mounted on a frame lug in the following manner: The stud 4 is engaged in the slot 2 of the frame lug by presenting it in such manner that it easily enters this slot. When it has reached the end of the slot, it is sufficient to turn the support plate which drives the stud until a wedging effect is produced between the stud and the opposite sides or edges of the slot. When this wedging occurs, the rotation of the support plate is pursued until the centering means 7 is elastically clipped in said slot.

Figure 3:
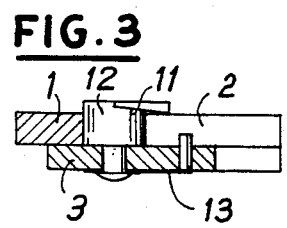
FIG. 3 is a sectional view similar to FIG. 2 of a modification.
Figure 4:
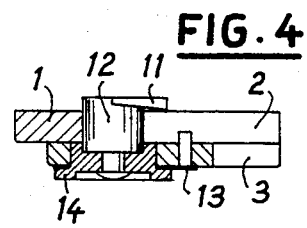
FIG. 4 is a sectional view similar to FIG. 2 of another modification.

In the embodiment shown in FIGS. 3 and 4, the wedging means comprise a sloping surface 11 which laterally projects from a stud 12 rotatably mounted on the support plate with a high degree of friction. This surface, which is inclined with respect to the adjacent surface of the frame lug, is adapted to cooperate with this adjacent surface for the purpose of blocking the support plate with respect to the frame lug. In the case of the embodiment shown in FIG. 3, the stud defining said inclined surface is merely rotatably mounted with a high degree of friction on the support plate, and is maintained axially in position by a riveting, as in the preceding embodiment. Also as in the preceding embodiment, an elastically yieldable centering means 13 carried by the support plate is provided for determining the correct position of the plate with respect to the frame lug.

In the embodiment shown in FIG. 4, a ring 14 is provided between the stud 12 defining the inclined surface 11 and the support plate for facilitating the relative rotation between the support plate and the stud after the latter has been wedged in position relative to the frame lug.

These two blocking devices operate in the same manner. The support plate is engaged in the slot 2 of the frame lug by giving it such position that the inclined surface 11 does not interfere with the rear side of the lug. When the stud 12 has reached the rear end of the lug, the support plate is turned in such manner as to bring the inclined surface 11 gradually into engagement with the rear side of the lug. When the wedging occurs, the rotation of the support plate is pursued until the positioning or centering means 13 is elastically engaged in the slot 2.

As in the preceding embodiment, it can be seen that the mounting is carried out in a particularly simple manner without necessity to untighten and then tighten a nut and a screw. Further, the means employed are simple and cheap so that the objects of the invention are attained.

In both cases, the device permits the mounting of the support plate on frame lugs which have different thicknesses, for example between 35 and 50 mm.

Having now described my invention what I claim as new and desire to secure by Letters Patent is:

1. A device for fixing a derailleur support on a bicycle frame lug defining a slot, said device comprising wedging means which are rotatably mounted on the support with a high degree of friction between the support and the wedging means for cooperation with the frame lug for holding the support on the lug by a wedging effect on the frame lug, and an elastically yieldable means which is carried by the support and is capable of engaging in said slot of the frame lug for centering the support relative to the frame lug.

2. A device according to claim 1, wherein the wedging means comprise a stud which laterally projects from the support, said stud comprising a cylindrical active surface which has a non-circular curved cross-sectional shape and which has a radial dimension which varies between two values which are respectively less than and greater than the width of said slot in the frame lug.

3. A device according to claim 1, wherein the wedging means comprise means defining an inclined surface which cooperates with a side of the frame lug opposed to a side against which side the support is intended to bear.

4. A device according to claim 1, wherein the centering means comprises a metal strip which is fixed to the support together with the wedging means and comprises adjacent a free end of the strip a formed-over part for cooperation with said slot.

5. A device according to claim 2, wherein said non-circular curved cross-sectional shape is an elliptical shape.

6. A device according to claim 2, wherein said non-circular curved cross-sectional shape is an oval shape.

7. A device for fixing a derailleur support on a bicycle frame lug which defines a first open ended slot, said device comprising in combination:
   a stud laterally extending from the support;
   means mounting the stud on the support and comprising means integral with the support and defining an aperture having a first smooth round-sectioned cylindrical surface and means integral with the stud and defining a second smooth round-sectioned cylindrical surface which is engaged in said first cylindrical surface to be rotatable about an axis with a high degree of friction between said first and second cylindrical surfaces;
   a second open-ended slot in the support in spaced relation to said aperture, said aperture and said second slot being adapted to be in alignment with said first slot when the support is placed laterally against said lug in a required angular position about said axis;
   wedging means on said stud which wedging means are operative to directly wedgingly engage said lug in a first angular position of the stud about said axis and relative to said lug and inoperative to wedgingly engage said lug and freely engageable in said first slot in a second angular position of the stud about said axis and relative to said lug;
   said degree of friction being sufficient to permit rotation of said stud to said first position by rotating the support about said axis relative to the lug but subsequently to permit a further rotation of the support relative to the stud and lug to said required angular position.

8. A device according to claim 7, wherein said wedging means comprise a second cylindrical surface on the stud which has a substantially elliptical cross-sectional shape which shape has a major axis dimension which exceeds the width of said slot of the lug and a minor axis dimension which is less than the width of said slot of the lug.

9. A device according to claim 7, wherein said wedging means comprise a portion of the stud which defines a surface which is inclined relative to a plane perpendicular to said axis and is adapted to be wedgingly applied against a side of the lug opposed to the side against which the support is applied when fixing the support to the lug.

10. A device according to claim 7, 8 or 9, further comprising means laterally extending from the support and spaced from said aperture and adapted to enter said slot of the lug for holding the support in said required position about said axis when the support is placed against the lug and rotated about said axis.

* * * * *